United States Patent
Chen et al.

(10) Patent No.: US 9,058,732 B2
(45) Date of Patent: Jun. 16, 2015

(54) METHOD AND APPARATUS FOR ENHANCED INDOOR POSITION LOCATION WITH ASSISTED USER PROFILES

(75) Inventors: An M. Chen, San Diego, CA (US); Jack Steenstra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 904 days.

(21) Appl. No.: 12/712,886

(22) Filed: Feb. 25, 2010

(65) Prior Publication Data

US 2011/0205053 A1 Aug. 25, 2011

(51) Int. Cl.
| | |
|---|---|
| G08B 1/08 | (2006.01) |
| G01C 21/24 | (2006.01) |
| H04W 24/00 | (2009.01) |
| G08B 25/01 | (2006.01) |
| H04W 4/22 | (2009.01) |
| G08B 21/04 | (2006.01) |
| H04W 76/00 | (2009.01) |
| G08B 21/02 | (2006.01) |
| G07C 9/00 | (2006.01) |
| H04W 8/18 | (2009.01) |
| H04W 4/02 | (2009.01) |

(52) U.S. Cl.
CPC ............... *G08B 25/016* (2013.01); *H04W 4/22* (2013.01); *G08B 21/043* (2013.01); *H04W 76/007* (2013.01); *G07C 9/00111* (2013.01); *H04W 8/18* (2013.01); *H04W 4/02* (2013.01); *G08B 21/0269* (2013.01)

(58) Field of Classification Search
None
See application file for complete search history.

(56) References Cited

U.S. PATENT DOCUMENTS

| | | | | |
|---|---|---|---|---|
| 5,825,283 A | * | 10/1998 | Camhi | 340/438 |
| 5,901,358 A | * | 5/1999 | Petty et al. | 455/456.2 |
| 6,028,514 A | * | 2/2000 | Lemelson et al. | 340/539.13 |
| 6,035,202 A | * | 3/2000 | Camp, Jr. | 455/456.1 |
| 6,148,211 A | * | 11/2000 | Reed et al. | 455/456.2 |
| 6,167,274 A | * | 12/2000 | Smith | 455/456.3 |
| 6,199,045 B1 | * | 3/2001 | Giniger et al. | 705/1.1 |

(Continued)

FOREIGN PATENT DOCUMENTS

| | | |
|---|---|---|
| CA | 2500082 | 9/2006 |
| CN | 1627043 A | 6/2005 |

(Continued)

OTHER PUBLICATIONS

Golding D., et al.,"Mobile Multimedia Applications", British Telecommunications Engineering, British Telecommunications Engineering, London, GB, vol. 17,. No. 1, Apr. 1, 1998, pp. 18-24, XP000765545.

(Continued)

*Primary Examiner* — Julie Lieu
(74) *Attorney, Agent, or Firm* — Charles Chesney

(57) ABSTRACT

A method of wireless communication includes maintaining user profile information, receiving a plurality of position locations, correlating the received position locations to determine failed correlations, determining blackout periods based on whether there is a gap in the received position locations, obtaining location information for the failed correlations and the blackout periods, updating the user profile information based on the obtained location information, receiving an emergency notification, and responding to the emergency notification based on at least one of the user profile information or an emergency position location received with the emergency notification.

20 Claims, 6 Drawing Sheets

(56) References Cited

U.S. PATENT DOCUMENTS

| | | | |
|---|---|---|---|
| 6,710,740 B2* | 3/2004 | Needham | 342/357.46 |
| 7,242,950 B2* | 7/2007 | Suryanarayana et al. | 455/456.5 |
| 7,545,278 B2* | 6/2009 | Okamoto et al. | 340/572.1 |
| 8,121,609 B2* | 2/2012 | Bosnjakovic et al. | 455/456.1 |
| 8,270,998 B2* | 9/2012 | Suryanarayana et al. | 455/456.5 |
| 8,285,300 B2* | 10/2012 | Craine et al. | 455/456.1 |
| 8,478,228 B2* | 7/2013 | Rowitch | 455/404.2 |
| 2002/0111172 A1 | 8/2002 | DeWolf et al. | |
| 2004/0024522 A1* | 2/2004 | Walker et al. | 701/210 |
| 2007/0024450 A1 | 2/2007 | Shichiku et al. | |
| 2007/0279218 A1* | 12/2007 | Daniel | 340/539.13 |
| 2008/0306826 A1* | 12/2008 | Kramer et al. | 705/14 |
| 2009/0012936 A1* | 1/2009 | Leidner | 707/3 |
| 2010/0042911 A1* | 2/2010 | Wormald et al. | 715/205 |
| 2011/0137549 A1* | 6/2011 | Gupta et al. | 701/201 |
| 2011/0195687 A1* | 8/2011 | Das et al. | 455/404.2 |
| 2012/0184300 A1* | 7/2012 | Crandall et al. | 455/456.3 |
| 2012/0253665 A1* | 10/2012 | Forstall et al. | 701/450 |
| 2012/0259631 A1* | 10/2012 | Lloyd et al. | 704/233 |
| 2013/0147663 A1* | 6/2013 | Ische et al. | 342/357.29 |

FOREIGN PATENT DOCUMENTS

| | | |
|---|---|---|
| CN | 1852580 A | 10/2006 |
| CN | 101083585 A | 12/2007 |
| EP | 2101524 A1 | 9/2009 |
| GB | 2410850 A | 8/2005 |

OTHER PUBLICATIONS

International Search Report and Written Opinion—PCT/US2011/026376—ISA/EPO—Nov. 28, 2011.

* cited by examiner

METHOD AND APPARATUS FOR ENHANCED INDOOR POSITION LOCATION WITH ASSISTED USER PROFILES

BACKGROUND

1. Field

The following description relates generally to wireless communication and, more particularly, to a method and an apparatus for enhanced indoor position location with assisted user profiles.

2. Background

There exists a number of position location services offered through the wireless carriers today. These services consist of two common system components: 1) a device that periodically or on demand reports its position location and 2) a user interface either via a web portal or an application running on a mobile handset to view or to query the current position of the device.

Given the current technology of GPS and Assisted GPS (A-GPS), the position location has an accuracy of approximately 5 m to 50 m when the device is in a clear outdoor position location. The GPS signal is often very poor for indoor reception. Position location cannot be determined if the GPS signal is not received. Many companies are working or have solutions in the marketplace to provide an enhanced indoor position location. One of the well-known approaches is Qualcomm's SnapTrack, which uses a location server with a reference GPS receiver that can simultaneously detect the same satellites as a wireless handset with partial GPS information (i.e., information from less than four GPS satellites) in order to find the weak GPS signal. The wireless handset collects measurements from both the GPS satellites and the wireless mobile network. These measurements are combined by the location server to produce position estimation.

For indoor position location, there exists one notable solution using Wi-Fi Access Point (AP) from SkyHook. The underlying technology requires the knowledge of the positions of the Wi-Fi APs. For a Wi-Fi capable handset, it will determine its position location using the Wi-Fi AP location. This technology requires an accurate location of the Wi-Fi APs and the mobile handset to be Wi-Fi capable. Although this method has been considered the most compelling solution for indoor position determination, this approach has many shortcomings. First, the approach is not easily scalable, as positions of the Wi-Fi APs must be constantly determined. Second, Wi-Fi APs within private areas (e.g., corporations, large living complexes) are not accessible in order to build out a comprehensive database of AP locations. Third, not all handsets are Wi-Fi capable, and therefore would not be able to utilize this technology. Fourth, a user may roam into an area where there is no Wi-Fi AP or the Wi-Fi AP position is not known.

As such, there exists a need for an enhanced indoor position location without the limitations as stated supra.

SUMMARY

In an aspect of the disclosure, a method of wireless communication includes maintaining user profile information, receiving a plurality of position locations, correlating the received position locations to determine failed correlations, determining blackout periods based on whether there is a gap in the received position locations, obtaining location information for the failed correlations and the blackout periods, updating the user profile information based on the obtained location information, receiving an emergency notification, and responding to the emergency notification based on at least one of the user profile information or an emergency position location received with the emergency notification.

In an aspect of the disclosure, a method of wireless communication includes receiving user profile information for a user. The user profile information includes at least one location and a time period associated with each of the at least one location. The method includes receiving a plurality of position locations of the user, determining black out periods based on whether there is a gap in the received position locations, correlating the received position locations with the user profile information to determine the position locations with failed correlations, obtaining, from the user, locations corresponding to the determined blackout periods and the determined failed correlations of the received position locations, updating the user profile information based on the locations obtained from the user, receiving an emergency notification, and requesting emergency personnel to attend to the user at a location determined based on at least one of the user profile information or an emergency position location received with the emergency notification.

In an aspect of the disclosure, an apparatus for wireless communication includes means for maintaining user profile information, means for receiving a plurality of position locations, means for correlating the received position locations to determine failed correlations, means for determining blackout periods based on whether there is a gap in the received position locations, means for obtaining location information for the failed correlations and the blackout periods, means for updating the user profile information based on the obtained location information, means for receiving an emergency notification, and means for responding to the emergency notification based on at least one of the user profile information or an emergency position location received with the emergency notification.

In an aspect of the disclosure, an apparatus for wireless communication includes means for receiving user profile information for a user. The user profile information includes at least one location and a time period associated with each of the at least one location. The apparatus further includes means for receiving a plurality of position locations of the user, means for determining black out periods based on whether there is a gap in the received position locations, means for correlating the received position locations with the user profile information to determine the position locations with failed correlations, means for obtaining, from the user, locations corresponding to the determined blackout periods and the determined failed correlations of the received position locations, means for updating the user profile information based on the locations obtained from the user, means for receiving an emergency notification, and means for requesting emergency personnel to attend to the user at a location determined based on at least one of the user profile information or an emergency position location received with the emergency notification.

In an aspect of the disclosure, a computer program product includes a computer-readable medium. The computer-readable medium includes code for maintaining user profile information, receiving a plurality of position locations, correlating the received position locations to determine failed correlations, determining blackout periods based on whether there is a gap in the received position locations, obtaining location information for the failed correlations and the blackout periods, updating the user profile information based on the obtained location information, receiving an emergency notification, and responding to the emergency notification based on at least one of the user profile information or an emergency position location received with the emergency notification.

In an aspect of the disclosure, a computer program product includes a computer-readable medium. The computer-readable medium includes code for receiving user profile information for a user. The user profile information includes at least one location and a time period associated with each of the at least one location. The computer-readable medium further includes code for receiving a plurality of position locations of the user, determining black out periods based on whether there is a gap in the received position locations, correlating the received position locations with the user profile information to determine the position locations with failed correlations, obtaining, from the user, locations corresponding to the determined blackout periods and the determined failed correlations of the received position locations, updating the user profile information based on the locations obtained from the user, receiving an emergency notification, and requesting emergency personnel to attend to the user at a location determined based on at least one of the user profile information or an emergency position location received with the emergency notification.

In an aspect of the disclosure, an apparatus for wireless communication includes a processing system. The processing system is configured to maintain user profile information, to receive a plurality of position locations, to correlate the received position locations to determine failed correlations, to determine blackout periods based on whether there is a gap in the received position locations, to obtain location information for the failed correlations and the blackout periods, to update the user profile information based on the obtained location information, to receive an emergency notification, and to respond to the emergency notification based on at least one of the user profile information or an emergency position location received with the emergency notification.

In an aspect of the disclosure, an apparatus for wireless communication includes a processing system. The processing system is configured to receive user profile information for a user. The user profile information includes at least one location and a time period associated with each of the at least one location. The processing system is further configured to receive a plurality of position locations of the user, to determine black out periods based on whether there is a gap in the received position locations, to correlate the received position locations with the user profile information to determine the position locations with failed correlations, to obtain, from the user, locations corresponding to the determined blackout periods and the determined failed correlations of the received position locations, to update the user profile information based on the locations obtained from the user, to receive an emergency notification, and to request emergency personnel to attend to the user at a location determined based on at least one of the user profile information or an emergency position location received with the emergency notification.

DETAILED DESCRIPTION

Various aspects of the novel systems, apparatus and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of disclosure is intended to cover any aspect of the novel systems, apparatus and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Examples of apparatuses suitable for incorporating various aspects of the invention include, but are not limited to, a UE capable of operating in a wireless network. A UE may be referred to as a mobile phone, user terminal, a mobile station, a mobile device, a subscriber station, a wireless device, a terminal, an access terminal, a node, a handheld device, or some other suitable terminology. The various concepts described throughout this disclosure are intended to apply to all suitable apparatuses regardless of their specific nomenclature.

Figure 1:
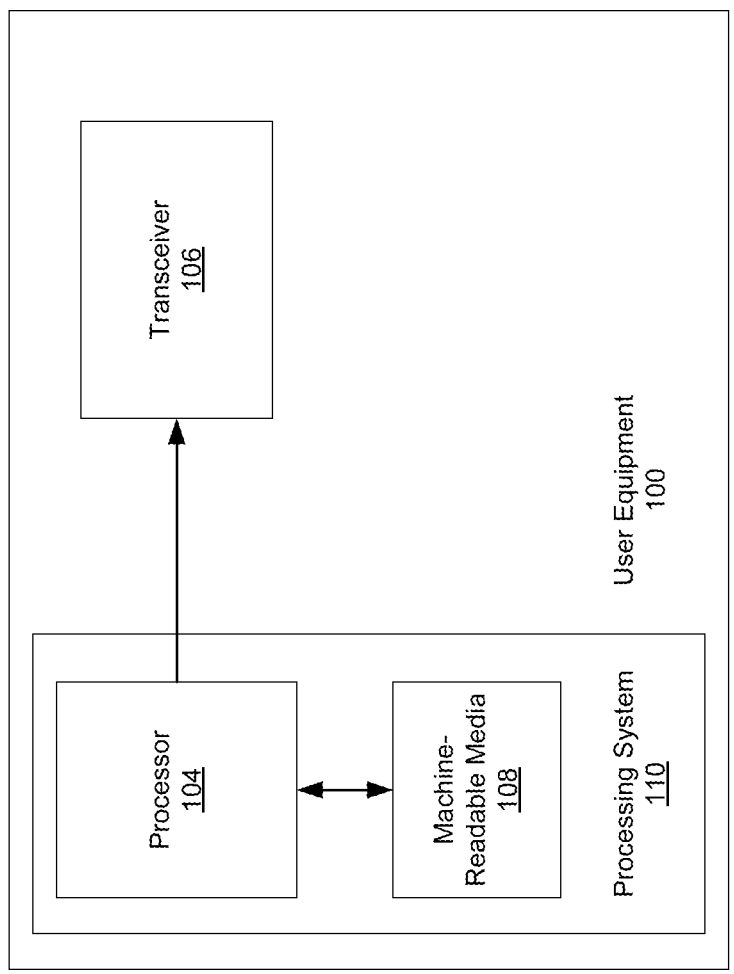
FIG. 1 is a conceptual block diagram illustrating a hardware configuration for an exemplary apparatus.

Various aspects of an apparatus will now be presented with reference to FIG. 1. FIG. 1 is a conceptual block diagram illustrating a hardware configuration for an apparatus. The apparatus 100 includes a processor 104, machine-readable media (memory) 108 coupled to the processor 104, and a transceiver 106 coupled to the processor 104. The transceiver 106 includes a GPS receiver. The processor 104 and the machine-readable media 108 may together be referred to as a processing system 110. However, the processing system 110 may include the processor 104 without the machine-readable media 108 for certain processor 104 configurations.

The processing system 110 may include one or more processors. The one or more processors may be implemented with any combination of general-purpose microprocessors, microcontrollers, a Digital Signal Processors (DSP), Field Programmable Gate Arrays (FPGA), Programmable Logic Devices (PLD), controllers, state machines, gated logic, discrete hardware components, or any other suitable entities that can perform calculations or other manipulations of information.

The processing system 110 may also include the machine-readable media 108 for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 110 to perform the various functions described below, as well as other protocol processing functions.

The machine-readable media 108 may include storage integrated into one or more of the processors. The machine-readable media 108 may also include storage external to the one or more processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, the machine-readable media 108 may include a transmission line or a carrier wave that encodes a data signal. Those skilled in the art will recognize how best to implement the described functionality for the processing system.

The UE 100 may be a mobile station (i.e., cell phone). The UE 100 may further include an emergency button that the user can trigger to call for emergency help. Alternatively or in addition, the UE 100 may include sensors to detect a potential emergency (e.g., detecting a fall) for automatic triggering the call for emergency help. The UE 100 is configured to receive GPS signals via the transceiver 106 and to transmit its GPS location via the transceiver 106 to the serving cell, which routes the information to a position location server.

Figure 2:
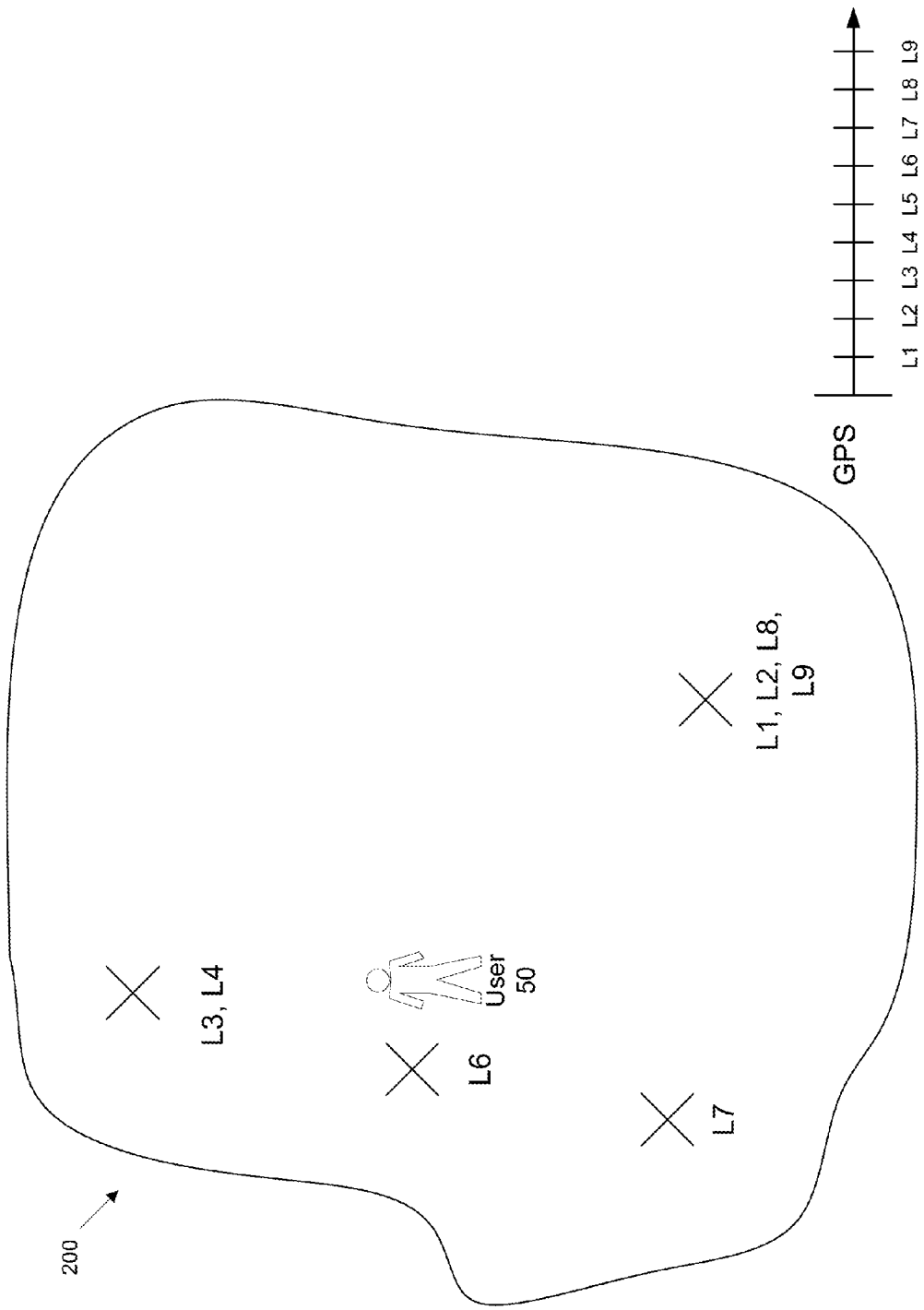
FIG. 2 is a conceptual diagram illustrating movement of a user and periodic reporting of user location.

FIG. 2 is a conceptual diagram 200 illustrating movement of a user and periodic reporting of a user location. The UE 100 is carried by the user 50 to various locations, such as, for example, locations L1 through L9. The UE 100 periodically reports its GPS location, transmitting its GPS location to its serving cell, which routes the GPS location information to a position location server. For example, L1, L2, L8, and L9 may be a senior living center; L3 and L4 a shopping center; L6 a street; and L7 a bakery. L5 is an unreported GPS position (i.e., blackout period), as the UE 100 may not be able to receive adequate GPS signals to ascertain its position.

Figure 3:
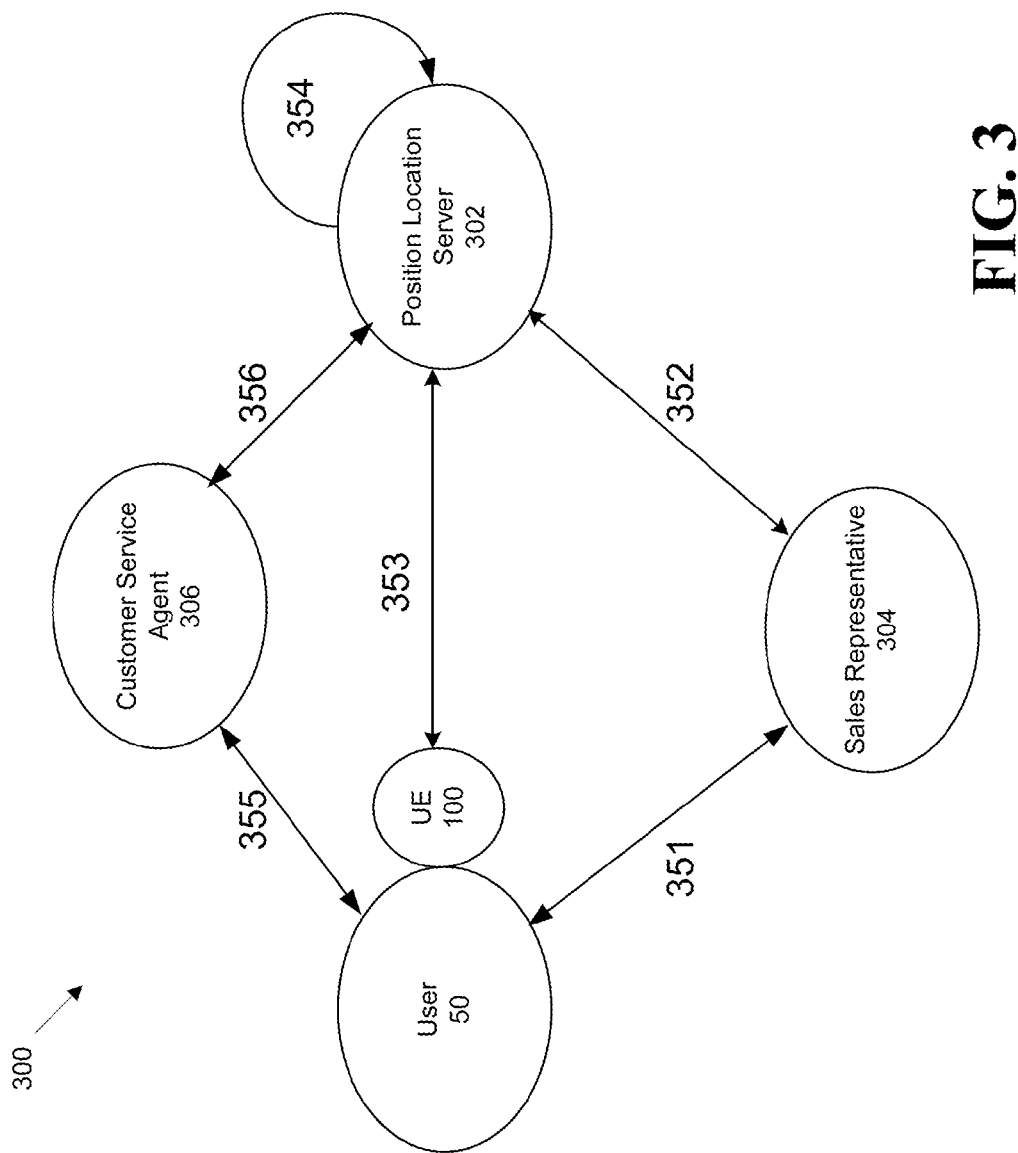
FIG. 3 depicts an exemplary method for an enhanced indoor position location.

FIG. 3 depicts an exemplary method 300 for an enhanced indoor position location. As shown in FIG. 3, information is collected from the user 50 (351). The information includes locations of the user's whereabouts during the day. The information may be collected by a sales representative 304. Alternatively, the information may be collected by an automated system. In one configuration, the user 50 signs up for the service with the sales representative 304 and the sales representative 304 collects user profile information. The user profile information includes a set of locations. In addition, the user profile information includes the time of day and the day of the week, month, or year in which the user 50 expects to be at those locations. For example, the user 50 may report that she is at the senior living center every day until 1:30 p.m. and after 5 p.m. and that she visits a particular shopping center every Wednesday from 2 p.m. to 3 p.m. Subsequently, the location and time information collected from the user 50 is provided to the position location server 302 and stored in a database (352).

The UE 100, which is carried by the user 50, makes periodic position fixes throughout the day and reports the fixes to the position location server 302 (353). In one configuration, the reported fixes are GPS coordinates. However, the UE 100 may determine an actual location (e.g., a particular bakery) based on the GPS coordinates and report the actual location rather than the GPS coordinates. In another configuration, the UE 100 reports user-provided locations that a user enters as text into the UE 100. The position location server 302 correlates the received position locations to determine failed correlations and determines blackout periods based on whether there is a gap in the received position locations (354). To correlate, the position location server correlates the received position locations with an actual location, correlates the position locations that do not correlate with an actual location with the user profile information, and determines the position locations with the failed correlations as the position locations that do not correlate with an actual location or with the user profile information. The position location server 302 stores information in the database indicating failed correlations and blackout periods (354). Blackout periods are position fixes not received by the position location server 302. Failed correlations are position fixes not sufficiently close to a user-reported location. For example, the position location server 302 may receive position fixes indicating that the user 50 was at the senior living center until 1:30 p.m. (L1, L2), at a shopping center from 2 p.m. to 3 p.m. (L3, L4), in a blackout period at 3:30 p.m. (L5), in the street at 4 p.m. (L6), in a bakery at 4:30 p.m. (L7), and at the senior living center at 5 p.m. and afterward (L8, L9). The position location server 302 may then flag the position fix L5 for a blackout period and L6 and L7 for failed correlations.

A customer service agent 306 may periodically contact the user 50 to check on the wellness of the user 50 and to test the UE 100 to ensure that the device is working properly. At that time, the customer service agent 306 may also gather information from the user 50 on where the user was located at particular times associated with blackout periods and failed correlations (355). With respect to the example above, the customer service agent 306 may gather information from the user 50 on where the user was located for position fixes L5 through L7. Alternatively, an automated system may be used rather than a customer service agent 306. In one configuration, the user may be prompted to fill out a questionnaire of her whereabouts on the UE 100 and the position location server 302 may retrieve the completed questionnaire. Subsequently, the gathered information is communicated to the position location server 302 (356). The position location server 302 updates its database with the information and updates the respective user profile so that position fixes at the same GPS location as L6 and L7 do not result in failed correlations.

Over time, the user profile at the position location server will capture accurate information on a user's position locations for any hour of the day and any day of the week, month, or year. The aforementioned method may be used in addition to the GPS, A-GPS, and WiFi location technology, as discussed supra, to provide improved accuracy of the user position location during an emergency event.

Figure 4:
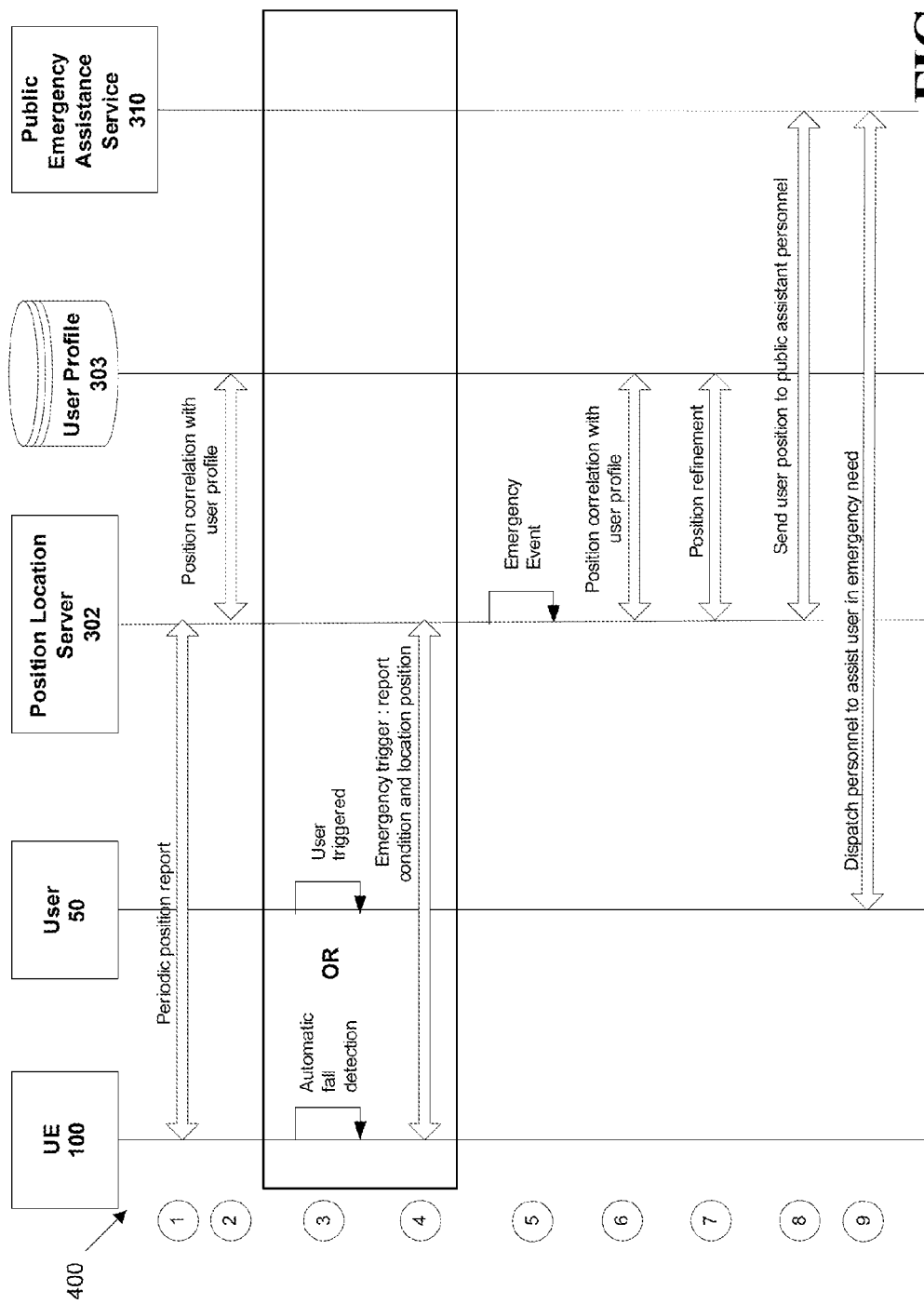
FIG. 4 is a diagram illustrating a sequence of execution during an emergency event.

FIG. 4 is a diagram 400 illustrating a sequence of execution during an emergency event. The UE 100 periodically reports its position location (1). The position location is correlated with the user's profile 303 stored in the position location server 302 (2). As discussed supra, the user's profile 303 includes location and time period information, i.e., a plurality of locations and associated time periods in which the user will be at the locations. An emergency event may be triggered, either by the user 50 or automatically through fall detection sensors in the UE 100 (3). The UE 100 then triggers an emergency event, notifying the position location server 302 of the emergency (4). If the UE 100 is able to obtain its emergency position location, the UE 100 also provides its emergency position location to the position location server 302 (4). The position location server 302 receives the emergency notification and processes the emergency event (5).

If an emergency position location is provided by the UE 100, the position location server 302 then correlates the provided emergency position location with the user profile 303 (6). That is, the position location server 302 correlates the emergency position location with a location listed in the user profile 303. If no emergency position location is provided with the received emergency event (i.e., the received emergency event is associated with a blackout period) or if the emergency position location does not correlate (i.e., match) with a location listed in the user profile 303, the position location server 302 attempts to refine the emergency position location based on the information in the user profile 303 (7). When refining the emergency position location, the position location server 302 determines the most likely position location of the user based on the emergency position location, if provided, and the information in the user profile 303.

If an emergency position location is received with the emergency event and the emergency position location correlates with a user-reported location in the user profile 303, the user-reported location is reported to the emergency personnel. If an emergency position location is received with the emergency event and the emergency position location does not correlate with a user-reported location in the user profile 303, but is within a predefined or predetermined radius of a user-reported location in the user profile 303, the emergency position location is refined to match the position location of the user-reported location and the user-reported location is reported to the emergency personnel. If an emergency position location is received with the emergency event, the emergency position location does not correlate with a user-reported location in the user profile 303, and the emergency position location is not within a predefined radius of a user-reported location in the user profile 303, the received emergency position location is not refined and is reported as is. Finally, if an emergency position location is not received with the emergency event (i.e., the emergency event has a blackout period), the position location server 302 tries to guess the most likely position location of the user. The position location server 302 guesses the most likely position location of the user based on the a previously reported position location, a location in the user profile 303 that correlates with the previously reported position location, recorded blackout periods in the user profile 303, the distance of user-reported locations during those recorded blackout periods from the previously reported position location, and a length of time between the previously reported position location and the emergency event.

After the position location server 302 refines the emergency position location, the position location server 302 sends the user's refined position location to the Public Emergency Assistance Service 310 (8). The position location server 302 may also provide the Public Emergency Assistance Service 310 with user information such as the user's sex, age, medical condition, and other medical information useful to any emergency personnel. Based on the information provided by the position location server 302, the Public Emergency Assistance Service 310 then dispatches emergency personnel to assist the user 50 (9).

Figure 5:
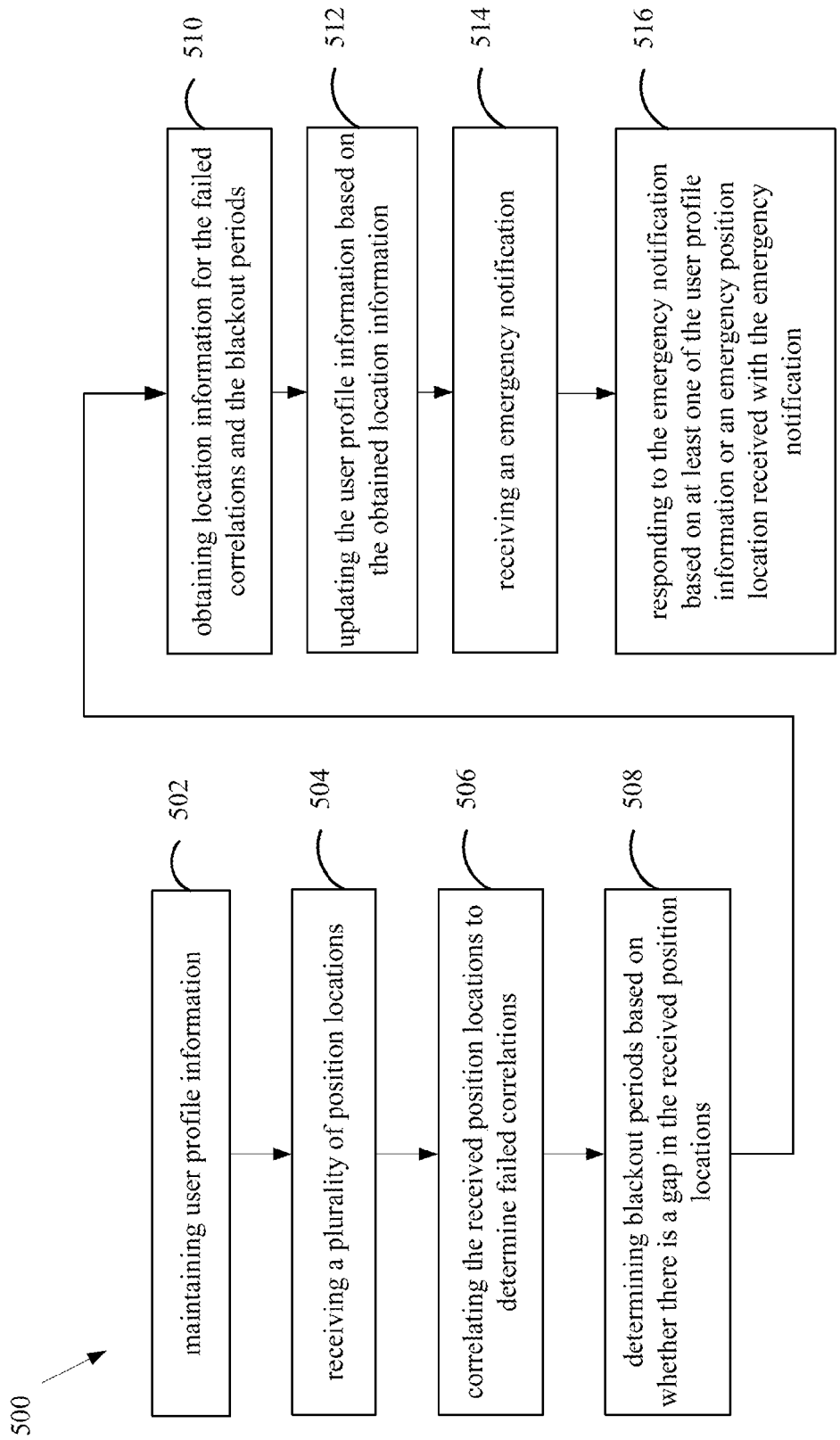
FIG. 5 is a flow chart of an exemplary method.

FIG. 5 is a flow chart 500 of an exemplary method. The method includes maintaining user profile information (502), receiving a plurality of position locations (504), correlating the received position locations to determine failed correlations (506), and determining blackout periods based on whether there is a gap in the received position locations (508). The method further includes obtaining location information for the failed correlations and the blackout periods (510). The user profile information is updated based on the obtained location information (512). When an emergency notification is received (514), the method includes responding to the emergency notification based on at least one of the user profile information or an emergency position location received with the emergency notification (516).

In one configuration, the user profile information is received for a user. The user profile information includes at least one location and a time period associated with each of the at least one location. In one configuration, the received position locations are GPS coordinates. The received position locations may further be user-reported locations or actual locations. That is, a user may provide actual locations to the UE 100 or the UE 100 may convert the GPS coordinates into actual locations and report the actual locations to the position location server 302. In one configuration, the location information obtained in step 510 includes locations corresponding to the failed correlations and the determined blackout periods.

In one configuration, the correlating of step 506 includes correlating the received position locations with an actual location, correlating position locations that do not correlate with an actual location with the user profile information, and determining the position locations with the failed correlations as the position locations that do not correlate with an actual location or with the user profile information. For example, a received position location may be 100 feet from a particular bakery. In such a situation, the received position location will not correlate with the particular bakery. However, the position location server 302 will correlate the received position location with the user profile information. If the user profile information includes the particular bakery as a location that the user visits, the actual location of the received position location will be determined as the particular bakery. If the user profile information does not include the particular bakery as a location that the user visits, the received position location will be flagged as an uncorrelated position location or as a failed correlation because the received position location did not correlate with an actual location or with the user profile information.

In one configuration, the responding to the emergency notification in step 516 includes requesting emergency personnel to attend to a user at an emergency location determined based at least one of the user profile information or a reported emergency position location. In one configuration, the method further includes receiving an emergency position location with the emergency notification, correlating the emergency position location with at least one of an actual location or the user profile information to determine the emergency location, and refining the emergency location when the emergency position location does not correlate with said at least one of an actual location or the user profile information, but is within a predetermined radius of a location in the user profile information. The process for correlating the emergency position location and refining the emergency location is the same as described in relation to the correlating step 506.

In one configuration, the method includes determining the emergency location based on at least one previously received position location and the user profile information when an emergency position location is not received with the emergency notification. That is, when an emergency position location is not received with the emergency notification, the position location server 302 must make a best guess of the location of the user based on a previously received position location and the user profile information.

In another configuration, the exemplary method includes receiving user profile information for a user. The user profile information includes at least one location and a time period associated with each of the at least one location. The method further includes receiving a plurality of position locations of the user, determining black out periods based on whether there is a gap in the received position locations, and correlating the received position locations with the user profile information to determine the position locations with failed correlations. Locations corresponding to the determined blackout periods and the determined failed correlations of the received position locations are obtained from a user. The user profile information is updated based on the locations obtained from the user. When an emergency notification is received, the method includes requesting emergency personnel to attend to the user at a location determined based on at least one of the user profile information or an emergency position location received with the emergency notification.

Figure 6:
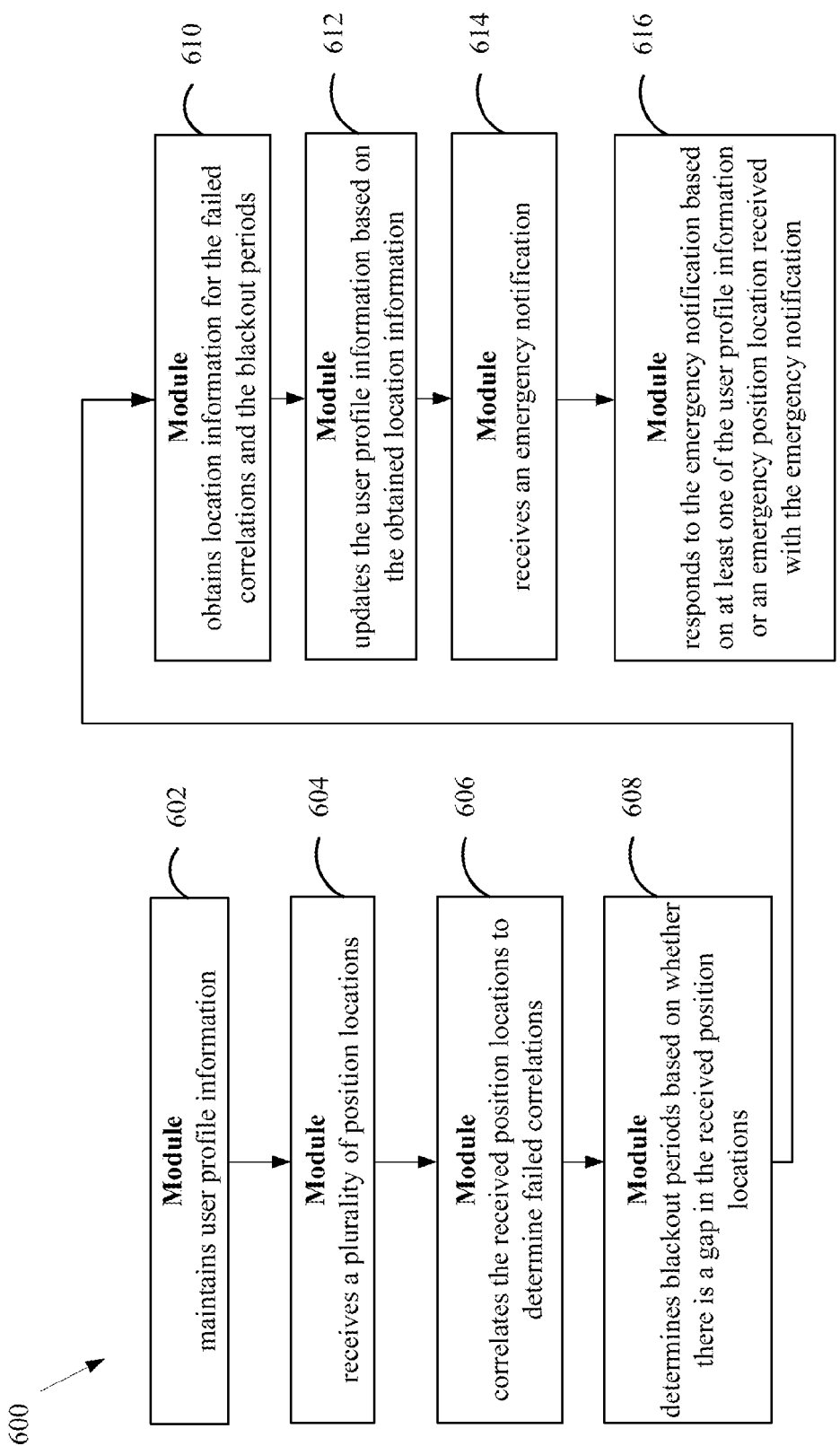
FIG. 6 is a modular diagram of an exemplary apparatus.

FIG. 6 is a modular diagram of an exemplary apparatus 100. The apparatus 100 includes a module 602 that maintains user profile information, a module 604 that receives a plurality of position locations, a module 606 that correlates the received position locations to determine failed correlations, and a module 608 that determines blackout periods based on whether there is a gap in the received position locations. The apparatus 100 further includes a module 610 that obtains location information for the failed correlations and the blackout periods. In a module 612, the user profile information is updated based on the obtained location information. When an emergency notification is received is module 614, a module 616 responds to the emergency notification based on at least one of the user profile information or an emergency position location received with the emergency notification.

In one configuration, the apparatus 100 includes means for maintaining user profile information, means for receiving a plurality of position locations, means for correlating the received position locations to determine failed correlations, means for determining blackout periods based on whether there is a gap in the received position locations, means for obtaining location information for the failed correlations and the blackout periods, means for updating the user profile information based on the obtained location information, means for receiving an emergency notification, and means for responding to the emergency notification based on at least one of the user profile information or an emergency position location received with the emergency notification. In another configuration, the apparatus 100 includes means for receiving user profile information for a user. The user profile information includes at least one location and a time period associated with each of the at least one location. The apparatus 100 further includes means for receiving a plurality of position locations of the user, means for determining black out periods based on whether there is a gap in the received position locations, means for correlating the received position locations with the user profile information to determine the position locations with failed correlations, means for obtaining, from the user, locations corresponding to the determined blackout periods and the determined failed correlations of the received position locations, and means for updating the user profile information based on the locations obtained from the user, means for receiving an emergency notification, and means for requesting emergency personnel to attend to the user at a location determined based on at least one of the user profile information or an emergency position location received with the emergency notification. The aforementioned means is the processing system 110 configured to perform the function identified in each of the aforementioned means. Specifically, the aforementioned means in the processor 104 configured to perform the function identified in each of the aforementioned means.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of wireless communication, comprising:
   receiving, from a user equipment (UE), a plurality of position locations of a user, each position location associated with a time period, the receiving occurring at a location away from the UE;
   maintaining, remotely from the UE, user profile information associated with the UE based at least in part on the position locations and associated time periods;
   associating a first time period with a location when the first time period corresponds to an unknown location;
   updating the user profile information based on the association of the first time period with the location;
   receiving an event trigger from the UE; and
   estimating, upon receiving the event trigger, a current location of the user based at least in part on the user profile information when a position of the user is not received.

2. The method of claim 1, in which the associating comprises receiving user input about the user's location during the first time period.

3. The method of claim 1, in which maintaining the user profile information further comprises:
   determining when a first user position location does not correlate to a known location in the user profile information; and
   correcting the first user position location to correlate to a profiled location in the user profile information.

4. The method of claim 3, further comprising notifying emergency personnel of the profiled location when a user's most recent available location at a time of an emergency event correlates to the first user position location.

5. The method of claim 1, in which the estimating occurs in response to an emergency event.

6. The method of claim 5, in which estimating the current location of the user comprises comparing the user profile information with a date and time corresponding to the emergency event.

7. The method of claim 1, in which estimating the current location of the user comprises determining a plurality of potential user locations based at least in part on the user profile information.

8. An apparatus configured for wireless communications comprising:
   means for receiving, from a user equipment (UE), a plurality of position locations of a user, each position location associated with a time period, in which the receiving means is remotely located from the UE;
   means for maintaining user profile information associated with the UE based at least in part on the position locations and associated time periods, in which the maintaining means is remotely located from the UE;
   means for associating a first time period with a location when the first time period corresponds to an unknown location;
   means for updating the user profile information based on the association of the first time period with the location;
   means for receiving an event trigger from the UE; and means for estimating, upon receiving the event trigger, a current location of the user based at least in part on the user profile information when a position of the user is not received.

9. The apparatus of claim 8, in which the means for maintaining the user profile information further comprises:
  means for determining when a first user position location does not correlate to a known location in the user profile information; and
  means for correcting the first user position location to correlate to a profiled location in the user profile information.

10. The apparatus of claim 9, in which the estimating means operates in response to an emergency event.

11. An apparatus configured for wireless communications comprising:
  a memory; and
  at least one processor coupled to the memory and located remotely from the UE, the at least one processor being configured:
    to receive, from a user equipment (UE), a plurality of position locations of a user, each position location associated with a time period;
    to maintain user profile information associated with the UE based at least in part on the position locations and associated time periods;
    to associate a first time period with a location when the first time period corresponds to an unknown location;
    to update the user profile information based on the association of the first time period with the location;
    to receive an event trigger from the UE; and
    to estimate, upon receiving the event trigger, a current location of the user based at least in part on the user profile information when a position of the user is not received.

12. The apparatus of claim 11, in which the at least one processor is further configured to receive user input about the user's location during the first time period.

13. The apparatus of claim 11, in which the at least one processor is further configured to maintain the user profile information by:
  determining when a first user position location does not correspond to a known location in the user profile information; and
  correcting the first user position location to correspond to a profiled location in the user profile information.

14. The apparatus of claim 13, in which the at least one processor is further configured to notify emergency personnel of the profiled location when a user's most recent available location at a time of the emergency event corresponds to the first user position location.

15. The apparatus of claim 11, in which the at least one processor is further configured to estimate in response to an emergency event.

16. The apparatus of claim 15, in which the at least one processor is further configured to estimate the current location of the user by comparing the user profile information with a date and time corresponding to the emergency event.

17. The apparatus of claim 11, in which the at least one processor is further configured to estimate the current location of the user by determining a plurality of potential user locations based at least in part on the user profile information.

18. A computer program product configured for wireless communication, the computer program product comprising:
  a non-transitory computer-readable medium having non-transitory program code recorded thereon, the program code comprising:
    program code to receive, from a user equipment (UE), a plurality of position locations of a user, each position location associated with a time period, the receiving occurring at a location remote from the UE;
    program code to maintain, remote from the UE, user profile information associated with the UE based at least in part on the position locations and associated time periods;
  program code to associate a first time period with a location when the first time period corresponds to an unknown location;
  program code to update the user profile information based on the association of the first time period with the location;
  program code to receive an event trigger from the UE; and
  program code to estimate, upon receiving the event trigger, a current location of the user based at least in part on the user profile information when a position of the user is not received.

19. The computer program product of claim 18, in which the program code to maintain the user profile information further comprises:
  program code to determine when a first user position location does not correlate to a known location in the user profile information; and
  program code to correct the first user position location to correlate to a profiled location in the user profile information.

20. The computer program product of claim 19, in which the program code to estimate executes in response to an emergency event.

* * * * *